United States Patent

[11] 3,602,152

[72] Inventor Alan B. Hawes
   8504 Seaview Ave., Wildwood Crest, N.J. 08260
[21] Appl. No. 781,045
[22] Filed Dec. 4, 1968
[45] Patented Aug. 31, 1971

[54] ARTICULATED MONORAIL CAR TRUCK
   10 Claims, 5 Drawing Figs.
[52] U.S. Cl. ................................................ 105/145,
   104/119, 104/120, 105/4, 105/101, 105/133, 105/182 R
[51] Int. Cl. ............................................... B61b 13/06,
   B61c 9/06, B61c 13/08
[50] Field of Search ........................................... 104/119,
   120; 105/3, 4, 101, 133, 141, 144, 145, 182 R

[56] References Cited
   UNITED STATES PATENTS
   2,987,013  6/1961  Rosenbaum ................. 104/120 X
   3,014,434  12/1961  Cox ............................ 105/145

Primary Examiner—Arthur L. La Point
Assistant Examiner—Howard Beltran
Attorney—Berman, Davidson and Berman ABSTRACT: An articulated truck assembly for a monorail car. The truck assembly consists of a pair of segments universally swivelly hinged to rotate relative to each other both around vertical and transverse horizontal axes. The segments are provided with pairs of opposite load-supporting monorail wheels with buffer springs between the truck segments and the wheel axle assemblies. One of the segments carries a driving motor which is drivingly connected to the associated pair of monorail wheels. A pair of vertically-journaled guide wheels is provided at the swiveled connection of the truck segments, engageable with an upstanding monorail center guide rib. Additional similar vertically journaled pairs of guide wheels engageable with the center guide rib are provided on the segments at the opposite ends of the truck assembly, linkages being employed between the segments and the supporting wheel axle assemblies to avoid rubbing action by the center guide rib on the guide wheels when the truck segments angle relative to each other.

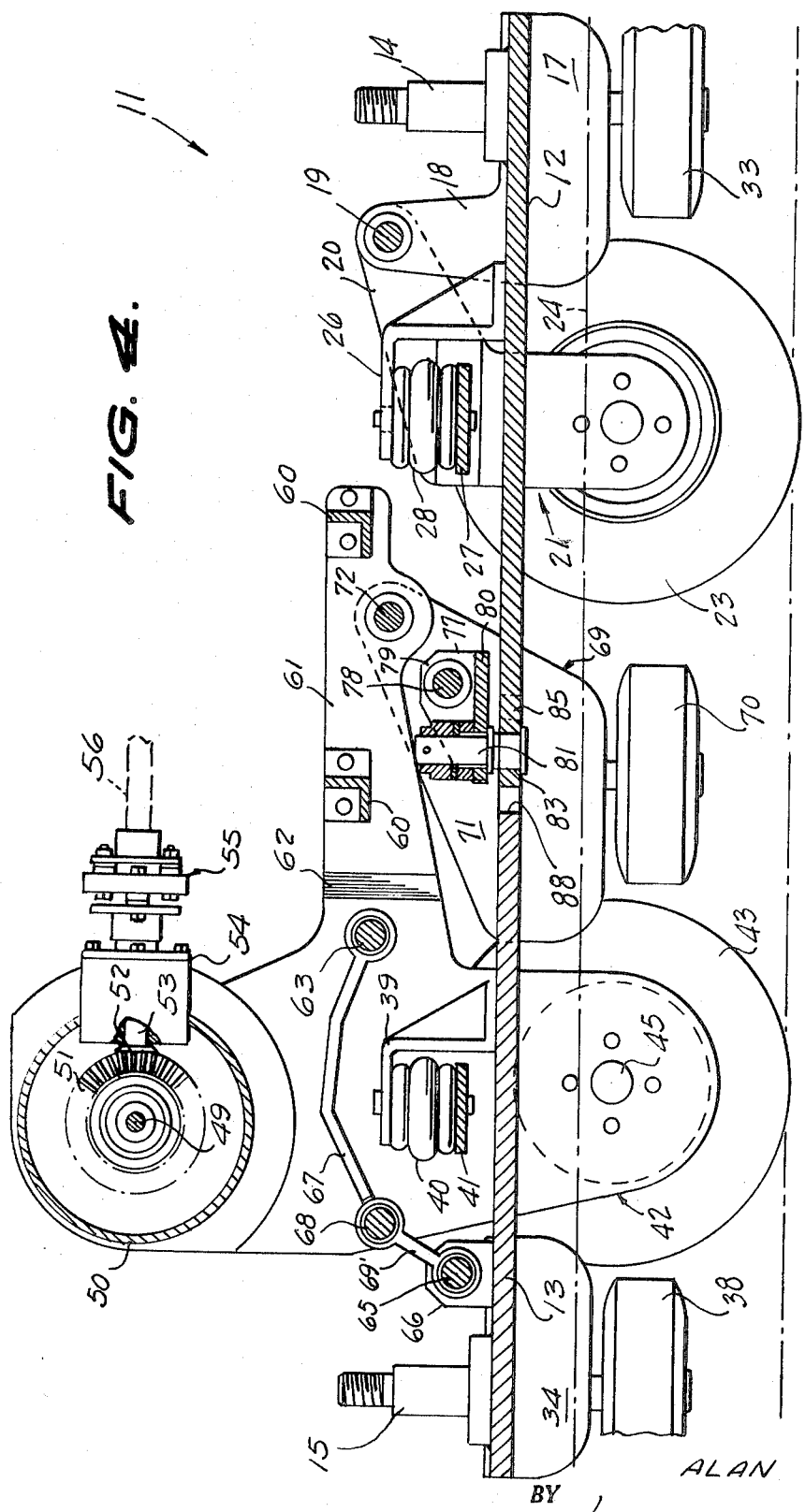

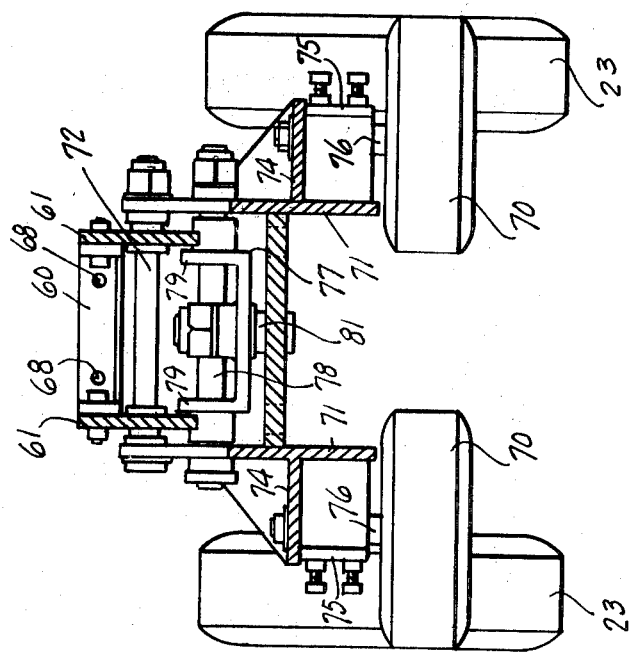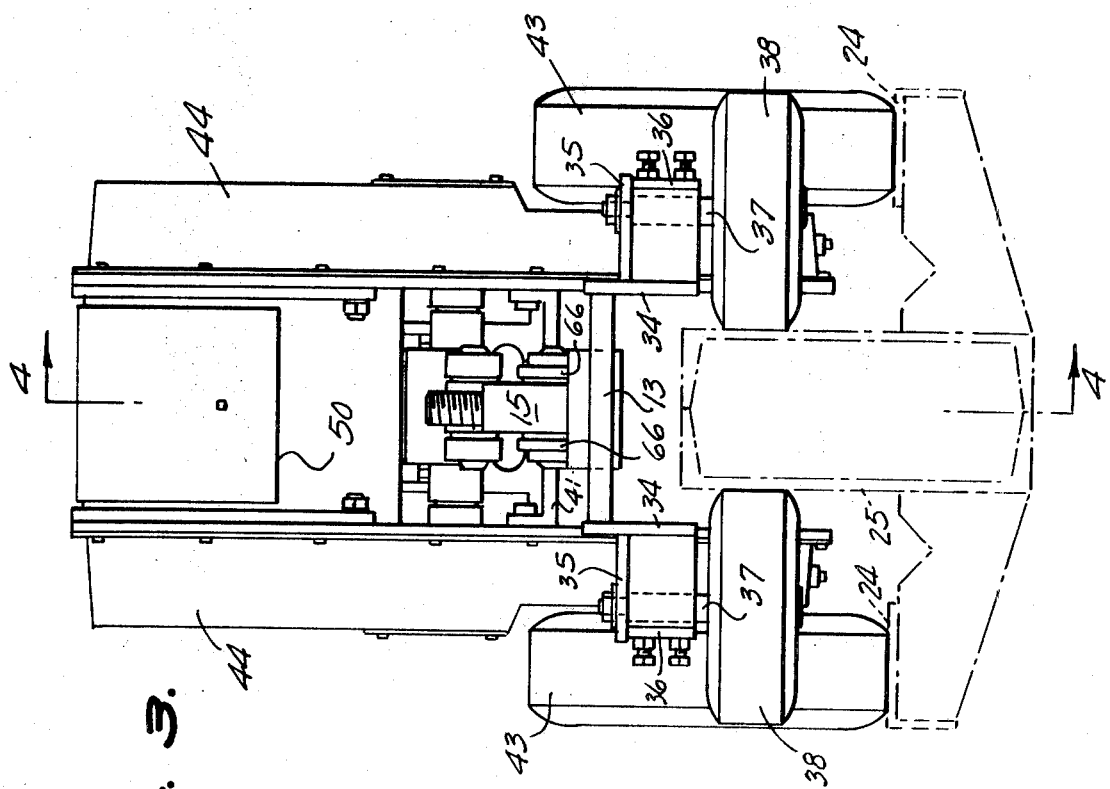

ARTICULATED MONORAIL CAR TRUCK

This invention relates to monorail truck assemblies, and more particularly to a monorail truck assembly of the articulated type provided with vertically journaled pairs of guide wheels which are engageable with an upstanding monorail center guide rib.

A main object of the invention is to provide a novel and improved articulated truck assembly of the type having vertically journaled guide wheels, said assembly being relatively simple in construction, being smooth in operation, and being so arranged as to avoid or minimize rubbing action on the vertically journaled guide wheels when the segments of the truck assembly angle relative to each other, for example, when the assembly passes over a curved portion of its supporting track.

A further object of the invention is to provide an improved articulated truck assembly for a monorail car, said assembly involving relatively inexpensive components, being very durable in construction, being inexpensive to fabricate, and requiring a relatively small amount of maintenance.

A still further object of the invention is to provide an improved articulated truck assembly for a monorail car, said assembly being of the type having spaced pairs of vertically journaled guide wheels engageable with an upstanding monorail center guide rib, the assembly being further provided with a drive motor, the segments of the assembly having novel link connections between their frame portions and their associated monorail supporting wheels, and also having vertically journaled guide wheels in the region of the swiveled connection between the segments, the arrangement involving only a small number of distinct parts, being easy to assemble, and being capable of functioning smoothly and quietly over long periods of time, and not requiring substantial attention.

Further objects and advantages of the invention will become apparent from the following description and claims, and from the accompanying drawings, wherein:

FIG. 3 is a front end elevational view of the articulated truck assembly of FIG. 1;

FIG. 4 is a longitudinal vertical cross-sectional view taken substantially on the line 4—4 of FIG. 3; and FIG. 5 is a transverse vertical cross-sectional view taken substantially on the line 5—5 of FIG. 1.

Figure 1:
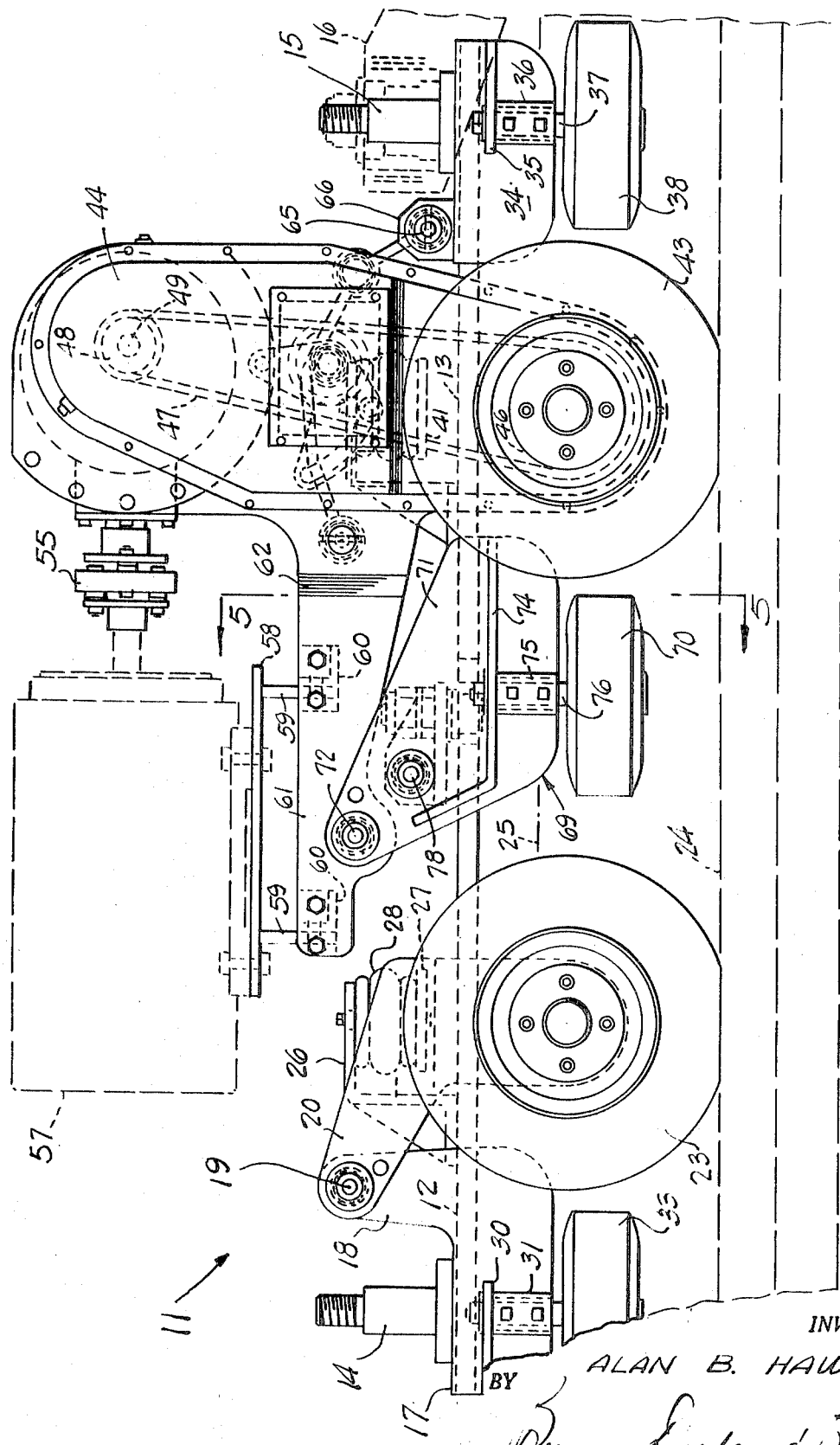
FIG. 1 is a fragmentary side elevational view of an improved articulated truck assembly for a monorail car constructed in accordance with the present invention.

Referring to the drawings, 11 generally designates an improved articulated truck assembly for a monorail car constructed in accordance with the present invention. The articulated truck assembly 11 comprises a horizontal platelike front frame segment 12, defining a first frame member and a rear platelike frame segment 13, defining a second frame member which are pivotally connected together for relative angular movement both around a vertical and a transverse horizontal axis, as will be presently described. The front segment 12 is provided with an upstanding pivot stud 14 for providing a pivotal connection between the adjacent portion of the associated car chassis and the front portion of the truck assembly, allowing horizontal pivoting action therebetween. Similarly, the rear segment 13 is provided with an upstanding stud 15 to provide a similar pivotal connection between the rear portion of the truck assembly and the associated car chassis. Thus, a portion of the chassis, shown at 16, is illustrated in dotted view as being connected to the upstanding rear connection stud 15. The chassis is connected in a similar manner to the front upstanding connection stud 14.

The front frame segment 12 is provided with parallel vertical longitudinally extending flanges 17,17 having the vertically extending upwardly directed arm portions 18 which are hingedly connected by a transversely extending hinge pin 19 to respective upwardly and rearwardly extending arms 20,20 provided on a front axle bearing assembly 21 in which is journaled a transverse main axle 22. Respective load-supporting wheels 23,23 are connected to the ends of the axle 22, said wheels being engageable on horizontal flange portions 24 of a conventional monorail track of the type having an upstanding center rib 25. The elements 23,21 define a first support-wheel assembly, associated with the first frame member 12.

Rigidly secured on the platelike front frame member 12 is a generally Z-shaped bracket member 26 whose top flange overlies the transversely extending platelike top member 27 of the axle bearing assembly 21. A snubbing spring assembly 28 is secured to and depends beneath the top flange of bracket member 26, being engageable with the plate member 27 to provide a cushioning action between the frame portion 12 of the front truck segment and its supporting wheel and axle assembly. Thus, the bearing assembly 21 is pivotal relative to the frame member 12 by the provision of the hinge connection defined by the transverse pivot pin 19 and its pivotal connections to the respective pairs of arms 18,20. Pivoting action is cushioned by the provision of the snubbing spring assembly 28 located between the top flange of bracket member 26 and the wheel bearing assembly top plate 27.

Respective outwardly projecting bracket plates 30,30 are rigidly secured to the forward end portions of the flanges 17,17. Adjustably secured to the laterally projecting plates 30 are respective depending sleeves 31,31 in which are secured vertical shafts 32,32 to the lower ends of which are journaled respective horizontal guide wheels 33,33 which are engageable with the opposite sidewalls of the center guide rib 25 to restrain the forward portion of the truck assembly against sidewise movement.

The rear segment frame plate 13 is likewise provided with longitudinal vertical flanges 34 to which are rigidly secured the laterally extending plate members 35. Adjustably secured to the plate members 35 are depending sleeves 36 in which are secured depending vertical shafts 37 on which are journaled rear horizontal guide wheels 38 likewise engageable with the opposite sides of the guide rib 25.

The rear segment frame plate 13 has rigidly secured thereon a generally Z-shaped bracket 39 whose top flange is provided with a snubber spring assembly 40, as shown in FIG. 4, similar to the snubber spring assembly 28, previously described. As mentioned previously, the front snubber spring assembly 28 is operatively connected to the transverse plate member 27 forming part of the front load wheel bearing assembly. Similarly, the rear snubber assembly 40 is connected between the top flange of the bracket 39 and a transversely extending plate member 41 rigidly connected to and forming part of a rear load wheel-containing assembly 42 having the pair of rear load-supporting wheels 43,43. The elements 43, 42 define a second support-wheel assembly, associated with the second frame member 13.

The load wheel-containing assembly 42 includes respective upstanding vertical chain housings 44,44 between which the transverse plate member 41 is rigidly secured. The rear load-supporting wheels 43,43 are secured on respective transverse axles 45 journaled in the lower portions of the housings 44 and provided with sprocket wheels 46 which are drivingly connected by sprocket chains 47 to smaller sprocket wheels 48 mounted on shafts 49 journaled in the top portions of the housings 44. The shafts 49 extend into a differential housing 50 and are provided with inwardly facing bevel gears 51 at their inner ends which are meshingly engaged by a pinion gear 52 carried on a longitudinal shaft 53 journaled in a bearing assembly 54 contained in the housing 50. Shaft 53 is connected by a conventional flexible coupling assembly 55 to the shaft 56 of an electric motor 57. Motor 57 is mounted on a horizontal supporting plate 58 which has depending transverse legs 59 bolted to transverse angle brackets 60 rigidly secured between a pair of forwardly extending arms 61,61 formed integrally with respective upstanding chain housings 44,44.

The arms 61 are provided with inward offsets 62 adjacent the chain housings 44. The rear portions of the arms are connected by a transverse hinge shaft 63, located rearwardly of the offset 62, as shown in FIG. 4. Another transverse hinge shaft 65 is secured between a pair of upstanding lugs 66,66 rigidly secured to the frame plate member 13. Shafts 63 and 65 are linked together by an arcuately bent link plate 67 which is, in turn, hingedly connected at 68 to another link plate 69'. The link plate 69' is hingedly connected to the rear hinge shaft 65 and the front end of the arched transverse link plate 67 is hingedly connected to the forward hinge shaft 63. The relatively long downwardly concave transversely extending arched link plate 67 is hingedly connected by the transverse hinge shaft 68 to the upper end of the relatively short transversely extending link plate 69', as is clearly shown in FIG. 4. The link plates 67 and 69' are of substantial width and their hinge sleeves are likewise of substantial length, whereby the linkage defined by the plates 67 and 69' act to substantially maintain the pivoting action between frame member 13 and the rear wheel assembly 42 substantially in a vertical plane.

The depending vertical supports 59,59 of the motor-supporting plate 58 are secured to the upstanding vertical webs of the angle bars 60,60 in any suitable manner, for example, by bolts extending through registering apertures in the plates 59 and the vertical flanges of the angle bars 60. As shown in FIG. 5, the vertical flanges of the angle bars 60 are provided with bolt holes 68,68 to receive such bolts.

Designated generally at 69 is an intermediate guide wheel assembly for the articulated monorail truck, the assembly including the opposing horizontal guide wheels 70,70 which engage the opposite sides of the upstanding vertical rib member 25 of the monorail track. The assembly 69 comprises the parallel vertical main supporting arms 71,71 which are pivotally connected at their top ends to the forwardly extending rear wheel assembly arms 61,61 by a transversely extending hinge shaft 72 extending between and located adjacent to the forward ends of the arms 61. The arms 71,71 are provided with respective outwardly projecting horizontal flange portions 74,74 to which are adjustably secured respective depending sleeves 75,75. Secured in the sleeves 75 are the respective vertical shafts 76 on the lower ends of which the lateral guide wheels 70 are journaled.

Figure 2:
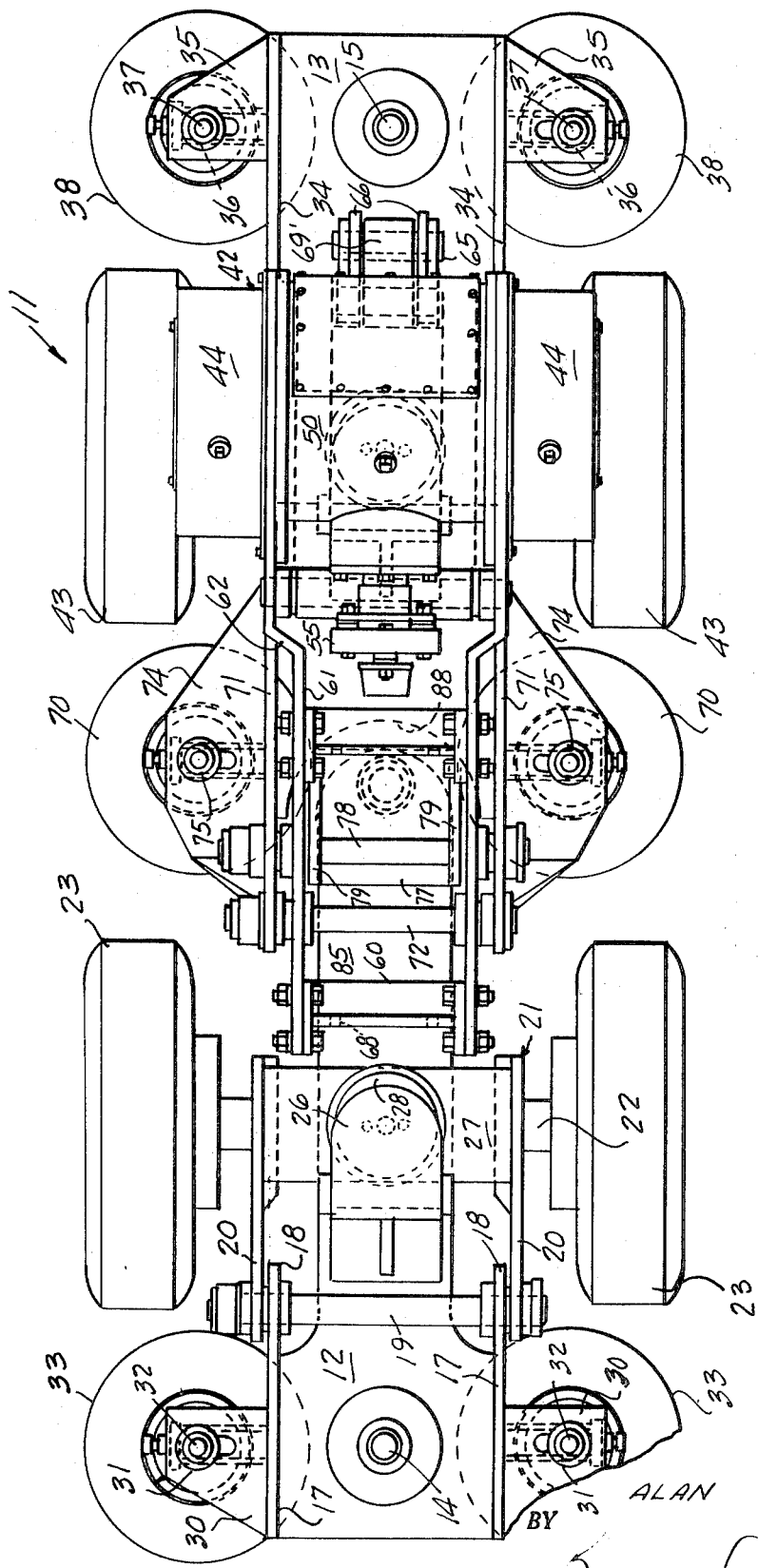
FIG. 2 is a top plan view of the assembly of FIG. 1 with the drive motor supporting plate removed.

Designated at 77 is a yoke member which is located between and hingedly connected to the arms 71,71 by a transverse hinge shaft 78 spaced downwardly and rearwardly from the main hinge shaft 72. Thus, the yoke member 77 has vertical upstanding end flanges 79,79 located inwardly adjacent the arms 71,71 through which the hinge shaft 78 extends, as shown in FIGS. 2 and 4. The yoke member 77 has a transversely extending bight portion 80 which is rotatably secured to and maintained parallel to the platelike main frame portion 12 of the forward segment of the articulated truck assembly. The bight portion 80 is thus pivotally connected to member 12 by a vertical pivot shaft 81 which is clampingly secured to bight portion 80 and which has a flanged bearing portion 83 swivelly connected to the rear end portion of member 12, as shown in FIG. 4. Thus, the yoke member 77 provides a universal type of connection between member 12 and the arms 71,71, allowing pivoting around the vertical axis defined by the upstanding vertical pivot shaft 81 and around the transverse horizontal axis defined by the transverse shaft member 78. Furthermore, pivoting of the driving wheel assembly 42 relative to the arm 71 on the transverse horizontal axis defined by the transverse hinge shaft 72 is also permitted.

From the above it will be readily apparent that because of the universal connection of the support assembly for the intermediate lateral guide wheels 70,70 said guide wheels are free to readjust their positions responsive to angling of the front and rear truck segments relative to each other either on a vertical or a transverse horizontal axis, as above described, namely, the vertical axis of vertical pivot shaft 81, or the transverse horizontal axis of transverse pivot shaft 78. Also, angling of the support assembly 69 for the guide wheels 70,70 is permitted relative to the arms 61,61 by the provision of the transverse hinge shaft 72. Therefore, efficient guiding action is provided by the wheels 70,70 at the intermediate portion of the assembly without, in any way, restraining the relative pivoting action of the front and rear truck segments, thereby allowing the front and rear guide wheels 33,33 and 38,38 to maintain smooth and effective engagement with the opposite side surfaces of the upstanding intermediate guide rib 25 of the monorail track, independently of the self-adjusting movements of the intermediate guide wheels 70,70. This minimizes any transverse rubbing actions on the tread portions of the guide wheels even where drastic changes in curvature either vertically or horizontally occur along the monorail track, thus greatly prolonging the life of the guide wheels and ensuring smooth and accurate guiding action thereof over long periods of time.

It will also be apparent that because of the universal connection of the intermediate guide wheel supporting assembly 69 to the front truck segment and the link connection of assembly 69 to the rear truck segment through the transverse hinge connection at shaft 72 and the longitudinal linkage defined by the link plates 67 and 69', the ability of the intermediate guide wheel assembly 69 to accurately and efficiently adjust itself will still be effective over a wide range of loading conditions and over a wide speed range.

It will be further apparent that the front and rear segments of the truck assembly are articulated so that they can pivot relative to each other not only around the vertical axis defined by the pivot pin 81, but also with respect to a transverse horizontal axis, for example, the transverse horizontal axis defined by the transverse pivot shaft 72, or with respect to some other resultant transverse horizontal axis determined by the combined effects of pivoting around the various transverse shafts 65, 68, 63, 72 and 78. As above mentioned, the pivoting action of the rear platelike frame member 13 relative to the rear driving wheel assembly 42 is cushioned by the provision of the buffer spring assembly 40 which acts to damp the amount of relative pivoting taking place between members 13 and assembly 42.

Suitable clearance is provided for pivoting around the vertical axis defined by the upstanding pivot shaft 81. As shown in FIGS. 2 and 4, the pivot shaft 81 is mounted on a reduced tongue portion 85 having a substantially semicircular rear edge, the semicircular end of the tongue portion 85 being concentrically received within a generally semicircular notch 88 provided in the forward end of the platelike frame member 13.

It will be noted that the frame members 12 and 13 are articulated through universal joint assembly 69 in a manner allowing the frame members and universal joint assembly to be movable relative to each other. Hence, the respective pairs of depending lateral guide wheels 33,33, 70,70 and 38,38 are likewise movable relative to each other. Thus, the relative movements of the various segments of the assembly can take place in a manner allowing the respective pairs of lateral guide wheels to adjust their positions of engagement with the guide rib 25 with minimum rubbing action on the guide wheels.

While a specific embodiment of an improved articulated monorail truck assembly has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. An articulated monorail truck assembly for a monorail having a pair of horizontal flanges and an intermediate upstanding guide rib comprising a first frame member provided with a pair of depending lateral guide wheels adapted to engage the monorail guide rib therebetween, a first support-wheel assembly engageable on the monorail horizontal flanges, means supportingly connecting the first frame member to the first support-wheel assembly, a second frame member provided with a second pair of depending lateral guide wheels adapted to engage the guide rib therebetween, a second support-wheel assembly engageable on the monorail horizontal flanges, means supportingly connecting the second frame member to the second support-wheel assembly, universal joint means connected to said first frame member and provided with a third pair of depending lateral guide wheels adapted to engage the guide rib therebetween, and transverse pivot means connecting said universal joint means to said second support-wheel assembly.

2. The articulated monorail truck assembly of claim 1, and wherein said universal joint means includes spaced sidearms to which said third pair of guide wheels are respectively journaled, a yoke member transversely pivoted between said sidearms, and vertical pivot means connecting the yoke member to said first frame member.

3. The articulated monorail truck assembly of claim 2, and wherein said second support-wheel assembly includes further arms extending adjacent said sidearms, said transverse pivot means comprising means pivotally connecting said sidearms and further arms for relative rotation on a transverse axis.

4. The articulated monorail truck assembly of claim 3, and wherein the means pivotally connecting the sidearms and the further arms comprises a transverse hinge shaft extending through said sidearms and said further arms.

5. The articulated monorail truck assembly of claim 4, and wherein said transverse hinge shaft is located above and is longitudinally spaced from the axis of the pivotal connection of the yoke member to said sidearms.

6. The articulated monorail truck assembly of claim 5, and wherein said further arms are received between and are inwardly adjacent to said sidearms.

7. The articulated monorail truck assembly of claim 6, and link means interconnecting said second frame member and said second support-wheel assembly and limiting pivotal movement of said second frame member relative to said second support-wheel assembly substantially to movement in a vertical longitudinal plane.

8. The articulated monorail truck assembly of claim 3, and wherein said second support-wheel assembly includes a pair of wheels supportingly engageable on the monorail horizontal flanges, and driving means connected to said wheels.

9. The articulated monorail truck assembly of claim 8, and wherein said second support-wheel assembly includes respective transversely spaced housings to the bottom ends of which said wheels are journaled, said driving means being contained in said housings, said further arms being respectively rigidly secured to said housings.

10. The articulated monorail truck assembly of claim 3, and wherein the means supportingly connecting the frame members to the support-wheel assemblies includes respective snubber spring assemblies connecting the frame members to the support-wheel assemblies and allowing, but acting to cushion, movement of the frame members relative to the support-wheel assemblies.